United States Patent Office 2,967,373
Patented Jan. 10, 1961

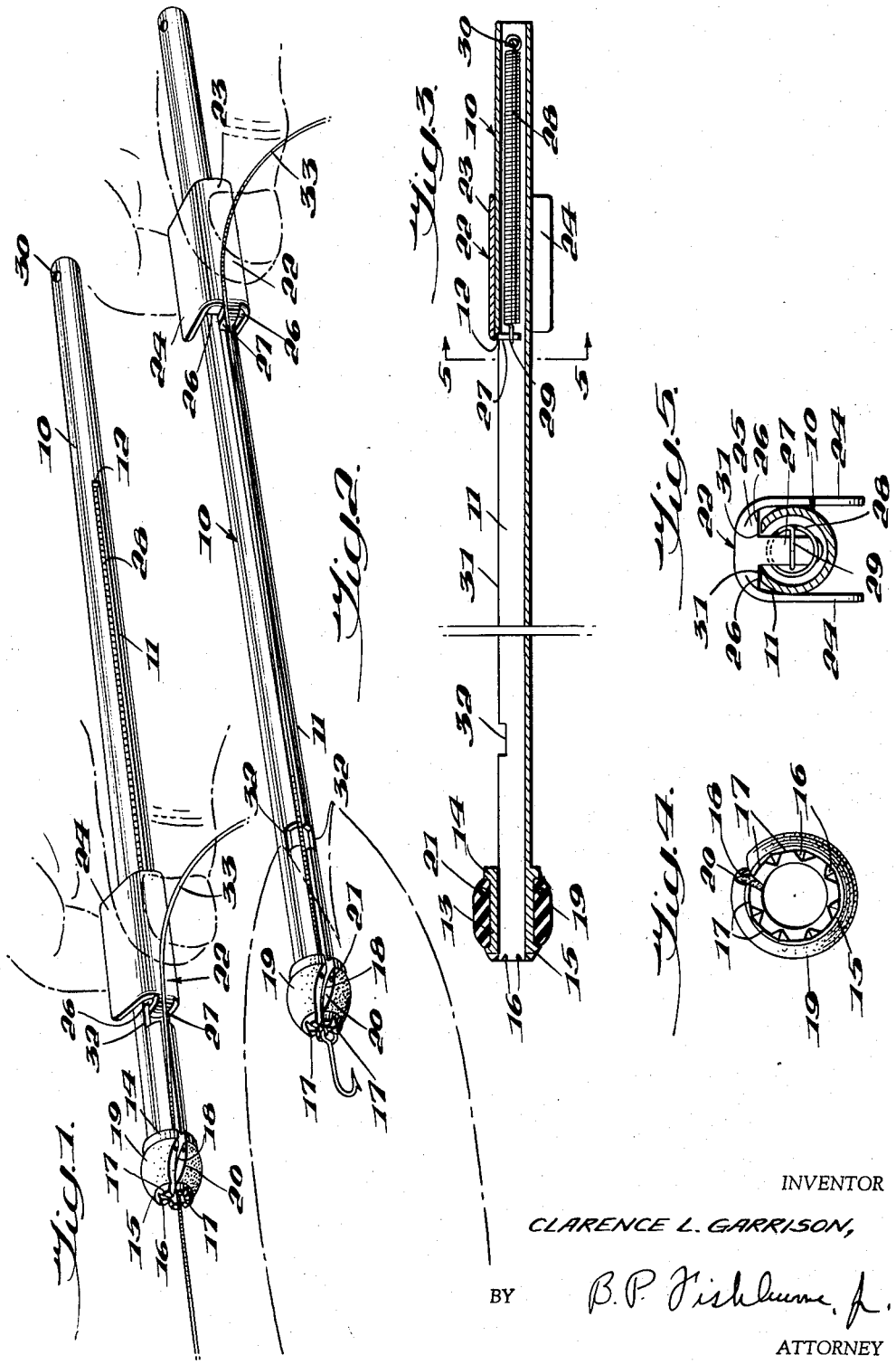

2,967,373
FISH HOOK DISLODGER
Clarence L. Garrison, Rte. 1, Naches, Wash.

Filed May 20, 1957, Ser. No. 660,353

3 Claims. (Cl. 43—53.5)

The present invention relates to a fish hook dislodger.

A primary object of the invention is to provide a fish hook dislodger which may be manipulated with one hand, and including resilient means, controllable by the user, for feeding the dislodger into the mouth of the fish a desired distance until the fish hook is engaged.

A further object is to provide a fish hook dislodger of the above-mentioned character which will automatically follow the fishing line down to the hook when a trigger device controlling the action of a spring is released.

A further object is to provide a fish hook dislodger which enters the mouth of the fish in a semi-automatic manner and at a speed controllable by a single hand of the operator.

A still further object is to provide a device of the above-mentioned character which is highly simplified and economical in construction and having a novel mode of operation.

Other objects and advantages of the invention will be apparent during the course of the following description.

In the accompanying drawings forming a part of this application and in which like numerals are employed to designate like parts throughout the same, Figure 1 is a perspective view of a fish hook dislodger in accordance with the present invention and illustrating a preliminary adjusted position of the same during use, Figure 2 is a further perspective view of the fish hook dislodger in use and illustrating a different adjusted or operative position of the same, Figure 3 is a central vertical longitudinal section through the fish hook dislodger, Figure 4 is an enlarged end elevational view of the dislodger, Figure 5 is an enlarged transverse vertical section taken on line 5—5 of Figure 3.

In the drawings wherein for the purpose of illustration is shown a preferred embodiment of the invention, the numeral 10 designates an elongated tube, forming the body portion of the fish hook dislodger. The tube 10 is provided throughout a major portion of its length with a straight longitudinal slot 11, as shown, and the rear end of the slot 11 terminates at 12, somewhat forwardly of the rear end of the tube 10 so as to provide a positive stop for a trigger device to be described.

At its forward end, the tube 10 has a slightly enlarged cylindrical portion 13 integral therewith, which portion is provided at its rear end with an annular shoulder 14, as shown. At its forward end, the enlarged portion 13 of the tube has a conically tapered head 15, provided in its forward face with a plurality of circumferentially spaced generally radial notches or serrations 16. The notches 16 in effect form a plurality of circumferentially spaced teeth 17 upon the forward end of the dislodger for direct engagement with the eye or shank of the fish hook, as will be further described.

The straight slot 11 of the tube 10 extends from its rear end 12 forwardly to the shoulder 14, and at this point, the slot 11 communicates with a substantially spiral or twisted slot 18, formed through the side wall of the enlarged portion 13 and through the shoulder 14 and the head 15. The slot 18 is in effect a continuation of the longer slot 11, although arranged at an angle to the latter, as shown. The slot 18 opens through the forward end of the head 15 between a pair of the teeth 17 as best shown in Figure 4.

Surrounding the enlarged tubular portion 13 is a resilient generally spherical ball-like element or head 19 of rubber or rubber-like material, and this resilient element 19 snugly engages the portion 13 and is positioned between the annular shoulder 14 and the head 15 as indicated. The element 19 has a slot 20 formed therethrough parallel with and registering with the slot 18. The element 19 is preferably removably mounted upon the enlarged portion 13 so that resilient heads of various sizes may be conveniently substituted for the particular head 19 shown in the drawing. For causing the element 19 to more tightly grip the portion 13, the same may have a contractile spring 21 embedded therein, such spring having separated ends at the slots 18 and 20 so that the fishing line may pass through these slots, as will be further described. If preferred, the spring 21 may be omitted and the inherent resiliency of the head 19 will be sufficient to cause it to grip the tube portion 13. Also, if preferred, the element 19 may be carried by an internally screw-threaded thimble or the like, not shown, which may have screw-threaded engagement upon the forward end of the device. I also contemplate manufacturing the device with the head 19 permanently secured thereto by means of cement or any other suitable securing means. The purpose of having the resilient head 19 removable is to provide the device with various sizes of resilient heads adapted to force their way into the mouths of various sizes of fish. In any event, the resilient element 19 will be sufficiently large to constitute a ball-like head upon the forward end of the implement as illustrated in the drawings.

Mounted to slide longitudinally upon the tube 10 is a trigger device 22, and this trigger device is generally U-shaped in cross section with a bight portion 23 and side extensions 24, as shown. At its forward end, the trigger device has a down-turned wall 25 providing locking edges 26, and between these locking edges is a further depending extension 27 integral with the wall 25 and of a width to engage through the slot 11 as shown in Figure 5. The bight portion 23 of the trigger device slidably engages the exterior of the tube 10 at its side adjacent to the slot 11, and the extensions 24 engage over opposite sides of the tube as indicated. The central extension 27 extends through the slot 11 and into the central bore of the tube 10, for connection with an axial retractile coil spring 28, as indicated at 29. The spring 28 is mounted within the rear end portion of the tube 10 and has its rear end connected with a fixed transverse pin 30, rigidly secured within the tube. As shown in Figure 3, the spring 28 normally holds the trigger device in a retracted position with the extension 27 contacting the stop shoulder 12.

As indicated in Figure 5 at 31, the side of the tube 10 having the slot 11 may be ground flat for engagement with the edges 26, and the flat faces 31 preferably blend smoothly into the rear cylindrical portion of the tube 10 beyond the rear end 12 of the slot, see Figure 3. Near and rearwardly of the shoulder 14, the tube 10 is provided at opposite sides of the slot 11 with a pair of locking notches 32, adapted to receive the locking edges 26 formed by the down-turned wall 25. When the trigger device 22 is shifted forwardly upon the tube 10, the edges 26 will readily enter into locking engagement with the notches 32, as shown in Figure 1, and the trigger device will remain locked in this position with the spring 28 stretched and under full tension, until released by the user.

The operation or use of the fish hook dislodger is as follows:

The trigger device 22 is first shifted forwardly from its position of Figure 2 and locked in the advanced position of Figure 1 by engagement of the locking edges 26 with the notches 32. The device is held in one hand, as illustrated in Figure 1, and the fishing line 33 is clamped firmly with the thumb against the trigger device, while the implement is placed under the fishing line so that the line may enter the forward portion of the slot 11 and also pass through the slot 18, as in Figure 1. When the line 33 has entered the slot 18, the implement may be turned somewhat upon its longitudinal axis, and this has the effect of locking the fishing line within the bore of the tube, forwardly of the trigger 22, due to the angularity of the slot 18. The fishing line will now extend axially through the forward end of the head 15 and forwardly of the entire device. The device is held at this time so that the fishing line is tensioned, forwardly of the implement, and the thumb continues to firmly clamp the line against the trigger device.

The trigger device 22 may now be lifted slightly with the one hand for disengaging the edges 26 from the notches 32 and while the line 33 is still tensioned forwardly of the implement, the spring 28 will automatically feed the tube 10 longitudinally along the fishing line and down into the mouth of the fish to the necessary extent, until the forward teeth 17 engage the fish hook, for example, in the manner indicated in Figure 2. The user has complete control over the semi-automatic feeding of the tube 10 into the mouth of the fish, merely by increasing or decreasing slightly his grip with one hand upon the tube and trigger device. The tube will follow the tensioned fishing line down to the hook, and there is no need for any aimless probing around inside the mouth of the fish to locate the hook.

Once the teeth 17 have engaged the eye or shank of the fish hook, it may be necessary for the user to project the entire implement forwardly somewhat to disengage the hook from the flesh of the fish, and the line is still maintained tensioned and clamped by the thumb against the trigger device 22 during this operation. This assures that after the fish hook is dislodged, it will still be held tightly against the forward end of the implement generally as indicated in Figure 2, so that the implement and the fish hook may be readily removed bodily from the mouth of the fish, without any further adjustment of the dislodger.

As previously mentioned, the resilient head 19 is of a shape and size to force its way into the mouth of the fish and to spread the mouth and guide the dislodger forwardly within the fish. The head 19 being enlarged also aids in the removal of the fish hook, after the same is dislodged from the fish, since the head will be as large or larger than the hook and will spread the mouth of the fish in advance of the hook as the hook is finally withdrawn from the fish.

It is now apparent that the entire operation and manipulation of the fish hook dislodger is accomplished with one hand, and in a fool-proof and highly expeditious manner, with the user having full control over the feeding of the tube 10 into the mouth of the fish, under the force of the retractile spring 28.

By means of the teeth 17 upon the head 15, once the fish hook or any part thereof has been engaged by the dislodger, the hook can be readily pushed forwardly, twisted, or otherwise manipulated for dislodging the same, and it is not necessary that the user be able to actually view the hook, since the device will automatically be guided into firm engagement therewith.

It is to be understood that the form of the invention herewith shown and described is to be taken as a preferred example of the same and that various changes in the shape, size and arrangement of parts may be resorted to, without departing from the spirit of the invention or the scope of the subjoined claims.

Having thus described my invention, I claim:

1. A fish hook dislodger comprising an elongated tube having a slot extending throughout a major portion of its length, said tube being provided near and rearwardly of its forward end with a locking notch, tooth means on the forward end of the tube for engaging the fish hook to dislodge it, a trigger element slidably mounted upon the tube and having an extension engaging through said slot of the tube and projecting into the bore of the tube, a retractile spring disposed within the bore of the tube and connected with the tube and with said extension of the trigger element, said trigger element having a part for locking engagement with said notch when the trigger element is shifted longitudinally of the tube in a direction to stretch the spring, the arrangement being such that the user with one hand may disengage the trigger element from said notch and control the feeding of the tube into the mouth of the fish and along the fishing line to the hook.

2. A fish hook dislodger according to claim 1 wherein the trigger element is generally U-shaped in cross section for engagement over the exterior of the tube, and a ball-like head of resilient material carried by the tube near the forward end of the tube to spread the mouth of the fish as the tube enters the same.

3. A fish hook dislodger comprising an elongated body portion provided at its forward end with an opening having its longitudinal axis extending longitudinally of said body portion, said opening passing through the forward end of said body portion, said body portion being provided at its forward end with spaced teeth which extend circumferentially around the forward end of said opening and are adapted to engage with the eye of a fish hook, a trigger device mounted upon the exterior of said body portion, the body portion being shiftable longitudinally with relation to the trigger device when the trigger device is held by the fingers against movement, means to guide the body portion upon the trigger device, means to automatically move the body portion forwardly with relation to said trigger device when said body portion is released, said last-named means including a spring, detachable means for securing the body portion to the trigger device when the body portion is shifted to its rear position with respect to the trigger device, the arrangement being such that a fishing line carrying the hook is movably mounted in the opening at the forward end of the body portion and is extended longitudinally of the body portion to reach the exterior of the trigger device against which it may be clamped by the finger, the body portion being guided along the line in its forward movement when it is released by the trigger device and moved forwardly by the spring.

References Cited in the file of this patent

UNITED STATES PATENTS

| | | |
|---|---|---|
| 1,728,864 | Kramer | Sept. 17, 1929 |
| 2,537,879 | Culhane | Jan. 9, 1951 |
| 2,722,080 | Lemberger | Nov. 1, 1955 |